US012578524B2

(12) United States Patent
Cheymol et al.

(10) Patent No.: US 12,578,524 B2
(45) Date of Patent: Mar. 17, 2026

(54) RADIATION-RESISTANT SILICA-BASED OPTICAL FIBRE

(71) Applicant: COMMISSARIAT A L'ENERGIE ATOMIQUE ET AUX ENERGIES ALTERNATIVES, Paris (FR)

(72) Inventors: Guy Cheymol, Bures sur Yvette (FR); Ayoub Ladaci, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 247 days.

(21) Appl. No.: 18/266,574

(22) PCT Filed: Nov. 18, 2021

(86) PCT No.: PCT/EP2021/082165
§ 371 (c)(1),
(2) Date: Jun. 9, 2023

(87) PCT Pub. No.: WO2022/128319
PCT Pub. Date: Jun. 23, 2022

(65) Prior Publication Data
US 2024/0053536 A1 Feb. 15, 2024

(30) Foreign Application Priority Data

Dec. 14, 2020 (FR) ..................................... 2013163

(51) Int. Cl.
*G02B 6/02* (2006.01)
*H01S 3/067* (2006.01)
(52) U.S. Cl.
CPC ...... *G02B 6/02395* (2013.01); *H01S 3/06716* (2013.01)

(58) Field of Classification Search
CPC ........................ G02B 6/02395; H01S 3/06716
USPC ......................................................... 385/123
See application file for complete search history.

(56) References Cited

U.S. PATENT DOCUMENTS

| | | | |
|---|---|---|---|
| 2002/0004138 A1 * | 1/2002 | Silverstein ......... | G02B 6/44384 |
| | | | 428/375 |
| 2013/0101261 A1 | 4/2013 | Cadier et al. | |
| 2020/0123052 A1 | 4/2020 | Schwartz et al. | |

FOREIGN PATENT DOCUMENTS

| | | | | |
|---|---|---|---|---|
| CN | 108322259 A | * | 7/2018 | ............. G01H 9/004 |
| FR | 3 008 194 A1 | | 1/2015 | |
| JP | S62-73215 A | | 4/1987 | |
| JP | 1-262509 A | | 10/1989 | |
| JP | 2003-344670 A | | 12/2003 | |

(Continued)

OTHER PUBLICATIONS

Sanada, et al., "Radiation resistance of fluorine-doped silica-core fibers", Journal of Non-Crystalline Solids, vol. 179, pp. 339-344, Nov. 1994.

(Continued)

*Primary Examiner* — Jerry M Blevins
(74) *Attorney, Agent, or Firm* — BakerHostetler

(57) ABSTRACT

A silica optical fiber resistant to radiations includes a core; a sheath surrounding the core; a polymer coating encasing the sheath, the coating being able to form hydrogen by radiolysis under the effect of the radiations so as to diffuse it into the optical fiber. An optical fiber device comprising at least one such radiation-resistant silica optical fiber.

11 Claims, 6 Drawing Sheets

(56) References Cited

FOREIGN PATENT DOCUMENTS

| | | | | |
|---|---|---|---|---|
| JP | 3814144 B2 * | 8/2006 | ............. | E21B 17/00 |
| RU | 2133486 C1 * | 7/1999 | .............. | A61B 1/31 |

OTHER PUBLICATIONS

Nagasawa, et al., "Improvement of Radiation Resistance of Pure Silica Core Fibers by Hydrogen Treatment", Japanese Journal of Applied Physics, vol. 24, No. 9, pp. 1224-1228, 1985.

Ladaci, et al., "Optimized radiation-hardened erbium doped fiber amplifiers for long space missions", Journal of Applied Physics, 2017.

Deparis, et al., "Influence of the cladding thickness on the evolution of the NBOHC band in optical fibers exposed to gamma radiations", Journal of Non-Crystalline Solids, vol. 216, pp. 124-128, 1997.

Brichard, et al., "Origin of the radiation-induced OH vibration band in polymer-coated optical fibers irradiated in a nuclear fission reactor", IEEE Transactions on Nuclear Science, vol. 49, No. 6, pp. 2852-2856, 2002.

Girard, et al., "Radiation Effects on Silica-Based Optical Fibers: Recent Advances and Future Challenges", IEEE Transactions on Nuclear Science, vol. 60, Issue: 3, pp. 2015-2036, 2013.

Cheymol, et al., "Irradiation Tests of Optical Fibers and Cables Devoted to Corium Monitoring in Case of a Severe Accident in a Nuclear Power Plant", IEEE Transactions on Nuclear Science, vol. 67, No. 4, pp. 669-678, 2020.

* cited by examiner

Section A-A

RADIATION-RESISTANT SILICA-BASED OPTICAL FIBRE

CROSS-REFERENCE TO RELATED APPLICATIONS

This application is a National Stage of International patent application PCT/EP2021/082165, filed on Nov. 18, 2021, which claims priority to foreign French patent application No. FR 2013163, filed on Dec. 14, 2020, the disclosures of which are incorporated by reference in their entirety.

FIELD OF THE INVENTION

The invention relates to the field of silica-based optical fibers, and more specifically silica-based optical fibers that are intended to be used in a radiative environment such as in a space medium or in a nuclear environment.

The invention can relate to non-doped, radiation-resistant optical fibers for the transmission of optical signals. The invention can also relate to doped, radiation-resistant optical fibers, notably for amplifier, amplified spontaneous emission source or fiber laser applications.

BACKGROUND

The invention relates to a silica-based optical fiber. Throughout the present description, the expression "silica-based optical fiber", simply referred to as "optical fiber", is understood to mean an optical fiber that can also comprise elements other than silicon (germanium, phosphorus, aluminum, boron, fluorine, etc.) and/or nitrogen and that can be doped or non-doped.

There are two major classes of optical fibers, the so-called "passive" non-doped fibers and the so-called "active" doped fibers.

A passive fiber is defined as being an optical fiber transmitting an optical signal without modifying it.

Conversely, an active fiber is defined as being an optical fiber transmitting an optical signal by modifying it, for example by amplifying it. Possible applications of an active fiber are an erbium-doped fiber amplifier (EDFA), an amplified spontaneous emission ("ASE") source or a fiber laser.

When an optical fiber is exposed to an ionizing radiation, such as electrons, neutrons, X rays and/or radiations y, a degradation of its optical performance levels is observed, in particular an increase in the attenuation per unit length of the optical fiber (designated "radiation-induced attenuation" or even "RIA") that can reach several dB per linear meter. Such an attenuation can be of the order of 1 to 10 dB per linear meter, for example 3 dB corresponding to a loss of 50%.

The loss of power occurs because the chemical links constituting the core of the optical fiber are disturbed by the energy of the radiations, which leads to the appearance of new electron transition states resulting in an additional absorption in the wavelength regions associated with said electronic transitions.

This phenomenon greatly limits the use of certain fibers in applications in radiative media, notably in applications in a nuclear or space medium, which is particularly critical for the EDFAs (used for example as inter-satellite communication lasers), the ASE sources (for example for the optical fiber gyroscopes in satellites) or the fiber lasers.

To limit this phenomenon, fibers are generally designed for which the composition and the spectral ranges of operation are the best suited to the medium for which they are intended.

With respect to the passive fibers, it is possible to choose fibers in which the core, the light beam transport vector, is made of ultrapure silica with a very low rate of impurity. Furthermore, a low fluorine doping can contribute to limiting the attenuation induced by the radiations, as described in the publication "*Radiation resistance of fluorine-doped silica-core fibers*", K. Sanada, N. Shamoto, and K. Inada, Proc. First PAC RIM Meet. Glass Opt. Mater., vol. 179, pp. 339-344, November 1994, doi: 10.1016/0022-3093(94) 90714-5.

However, despite these precautions, the performance losses, notably in the nuclear or space field, can be even greater over certain spectral ranges.

With respect to the active fibers, it is possible to choose fibers with a (co)doping of phosphorus and/or of aluminum in order to give the fiber great optical efficiency and render it active. However, this doping renders the fiber much more sensitive to the radiations than the passive fibers mentioned above (several orders of magnitude of additional loss in the infrared (IR) and the visible). Now, we have raised the fact that such active fibers are of great importance for the nuclear and space field, they constitute in particular the basis of the fiber lasers and of the optical amplifiers used in the space navigation and communication systems. It is therefore essential for them to be able to retain their properties under the effect of the radiations.

Thus, even though hardening solutions already exist, they remain insufficient for high radiation rates and are also sometimes difficult to apply.

Another known solution for reducing the effects of the radiations is to dope an optical fiber with hydrogen. This positive effect of the hydrogen has for example been described in the publication "*Improvement of Radiation Resistance of Pure Silica Core Fibers by Hydrogen Treatment*", Kaya Nagasawa, Yutaka Hoshi, Yoshimichi Ohki and Kichinosuke Yahagi, Japanese, Journal of Applied Physics, Volume 24, Part 1, Number 9 (1985) in the case of a so-called passive optical fiber with a pure silica core, and a sheath which can be made of fluorinated silica. The presence of the hydrogen in the fiber allows the conversion of the defects which have absorption bands in the visible and the near infrared into OH defects with an absorption band around 1380 nm. That greatly reduces the attenuation induced by the radiation of the optical fiber in the visible and the near infrared, as is illustrated in FIG. 1 (from the abovementioned publication).

This positive effect of the hydrogen has also been described in the publication "*Optimized radiation-hardened erbium doped fiber amplifiers for long space missions*" A. Ladaci, et al, Journal of Applied Physics 2017 for a so-called active amplifying fiber, for example an alumino-silica optical fiber whose core is co-doped with cerium and erbium. The presence of the hydrogen is thus highly beneficial in the hardening of such active fibers used in the optical amplifiers, as is illustrated in FIG. 2 (from the abovementioned publication).

However, hydrogen is a highly volatile gas. Keeping it in the core of the fiber throughout the operation of the optical fiber or of a system comprising such an optical fiber is very complicated.

In response to this issue, the patent application FR3008194 describes a method for manufacturing a radiation-resistant optical fiber comprising the following steps:

a) fabrication of a silica optical fiber preform;

b) formation in the preform of a longitudinal cavity;

c) fiber production of said preform so as to form an optical fiber (1) comprising a core (2), an optical sheath (6) and at least one longitudinal cavity (3) having at least one aperture (13) at an end of the optical fiber (1);

d) application, during the fiber production step c), of a gas-tight coating (4);

e) exposure of the optical fiber (1) to a gaseous substance, preferably comprising gaseous hydrogen and/or gaseous deuterium, so as to incorporate said gaseous substance in the silica via said aperture (13);

f) closure of every aperture (13) at the two ends of the optical fiber (1).

The silica optical fiber obtained illustrated in FIGS. 3A and 3B comprises:

a core (2);

an optical sheath (6);

at least one longitudinal cavity (3) disposed inside the optical sheath (6), the longitudinal cavity (3) being closed at the two ends of the optical fiber (1), a gas diffusion-tight coating (4) which is typically a thin layer of carbon or of metal.

Said silica optical fiber comprises in the at least one cavity (3) a determined concentration of gas, preferably from among gaseous hydrogen and/or gaseous deuterium.

Nevertheless, such a manufacturing method and the fiber obtained presents certain drawbacks.

On the one hand, there is no guarantee that the thin layer of carbon or of metal, of the order of a nanometer to several tens of nanometers, remains tight under the effect of the radiation and of the temperature, notably for long periods of use.

On the other hand, a coating by a thin layer of carbon or of metal cannot be produced on all types of fibers (such as the fibers with polymer sheath or the double-sheath fibers). Indeed, producing a metal coating on a polymer sheath can generate a risk of melting and damaging the sheath, and it is difficult, even impossible, to hold a carbon coating on a polymer sheath.

Furthermore, control of the quantity of hydrogen contained in the core of the fiber is complicated in this method.

This solution presents another defect, not the least, in that the hydrogen has a dual effect: a beneficial effect when the fiber is subjected to radiations, but a negative effect as long as the fiber is not yet irradiated or is subject to very low irradiation. Indeed, the hydrogen present in the fiber at the outset adds additional losses (losses by light diffusion) in the fiber that is as yet not irradiated (called "virgin fiber"). Thus, before the fiber is subjected to the radiations, there is only the negative effect of the additional losses in the virgin fiber. It can be seen in fact in FIG. 2 that, before irradiation and up to a very low dose, the fiber without hydrogen has a higher gain than the fiber with hydrogen.

SUMMARY OF THE INVENTION

The invention aims to overcome the abovementioned drawbacks of the prior art.

More particularly, the invention aims to enhance the performance of an optical fiber subjected to radiations, while maintaining its performance before the optical fiber is subjected to the radiations, and do so throughout the longest possible period of use. The invention aims in particular to be able to use an optical fiber in radiative media. The invention aims also to enhance the performance of any type of silica-based optical fiber, whether it be doped or non-doped and regardless of the dopant or dopants and the materials of the core and of the sheath.

The subject of the invention making it possible to remedy these drawbacks is a radiation-resistant silica optical fiber comprising:

a core;

a sheath surrounding the core;

a polymer coating encasing the sheath, said coating being able to form hydrogen by radiolysis under the effect of the radiations so as to diffuse said hydrogen formed into said optical fiber.

Radiolysis is a known phenomenon which consists of a release of hydrogen under the effect of an ionizing radiation in certain materials, notably polymers. The rate of generation of hydrogen per unit of weight and per dose of irradiation depends on the type of material but also on the dose rate, on the dose and on the type of irradiation.

Radiolysis is generally a phenomenon that is sought to be avoided in as much as it is accompanied by the risk of pressure increase if the radiolysis occurs in a tight closed medium. It can thus be reflected by a deterioration of the functional quality of certain materials.

On the contrary, the invention exploits this phenomenon so as to add to the optical fiber exposed to a radiative flux a quantity of hydrogen formed by radiolysis. Thus, the optical fiber according to the invention comprises a coating whose material comprises a polymer or a combination of polymers capable of forming and releasing hydrogen into the optical fiber under the effect of the radiations.

The radiolysis can generate a significant risk in the case where large quantities of polymer are implemented, which is not the case of the invention which implements small quantities (of the order of a few grams).

The advantages of the invention are:

the capacity to adapt the quantity of hydrogen released according to the hardening needs of the optical fiber: it is thus possible to choose a polymer material as a function of the environment in which it is planned to use the optical fiber (dose rate, total dose, temperature, etc.);

a greater reliability over time: indeed, there is no need for concern with the risks of leakage of the hydrogen over time as is the case of optical fibers previously charged with hydrogen.

Furthermore, since the hydrogen is generated by the irradiation and it is not present in the optical fiber previously, the undesirable effect described above due to the presence of the hydrogen when the optical fiber is not yet subjected to the radiations is avoided. This can be called self-activation of the hardening mechanism of the optical fiber.

"Hardening" should be understood to mean a mechanism aiming to protect the fiber from the radiations.

The type of polymer material, but also its physical state (solid, gel contained in a jacket of small thickness, etc.) and its thickness, can be chosen as a function of the conditions of irradiation of the optical fiber, and therefore as a function of the quantity of hydrogen desired in the optical fiber.

The optical fiber according to the invention can further comprise one or more of the following features taken alone or in all technically possible combinations. In other words, the embodiments indicated hereinbelow can be combined with one another.

According to a first variant embodiment, the coating is a solid layer of polymer material.

According to a second variant embodiment, the coating comprises a layer of gel of polymer material and a jacket capable of containing said gel between the sheath and said jacket. The jacket can be made of polymer or of metal.

According to a first embodiment, the polymer coating forms an annular coating around the sheath.

According to a second embodiment, the core and the sheath surrounding the core (the core and the sheath forming a standard optical fiber) are embedded in the polymer coating (which can be a solid polymer or in gel form). In particular, the standard optical fiber can have several windings, said windings being embedded in the polymer coating.

The polymer material comprises one or more elements from among: a polyethylene, a polypropylene, a poly-isobutylene, a polyvinyl chloride, polyethylene oxide, a polypropylene oxide, a polyoxymethylene.

The polymer material preferably has high radiolytic rate.

The core of the optical fiber can comprise one or more elements from among: silicon, germanium, phosphorus, aluminum, boron, fluorine, even nitrogen.

The core of the optical fiber can comprise one or more rare earth dopants from among lanthanum, cerium, erbium, ytterbium, neodymium, thulium and/or holmium.

The sheath of the optical fiber can comprise one or more elements from among: silicon, germanium, phosphorus, aluminum, boron, fluorine, even nitrogen.

It should be noted that at least one out of the core and/or the sheath comprises silica.

The invention relates also to an optical fiber device comprising at least one silica optical fiber according to the invention.

The invention is particularly advantageously applicable in the manufacturing of optical fibers, doped or not, and of devices and systems based on such optical fibers, intended to be used in a radiative environment such as the space medium, the nuclear and scientific instrumentation fields or even in medical appliances using radiations.

BRIEF DESCRIPTION OF THE DRAWINGS

Other features and advantages of the invention will emerge from the following description, given as an illustrative and nonlimiting example, in light of the attached figures in which.

DETAILED DESCRIPTION

FIGS. 1, 2, 3A and 3B have already been described and will not be repeated here.

Figure 1:
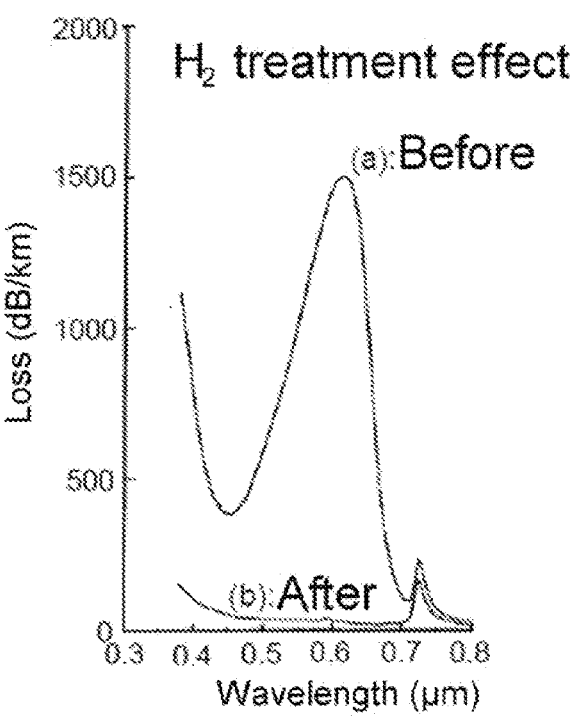
FIG. 1 illustrates the beneficial effects of hydrogen on a non-doped optical fiber.
Figure 2:
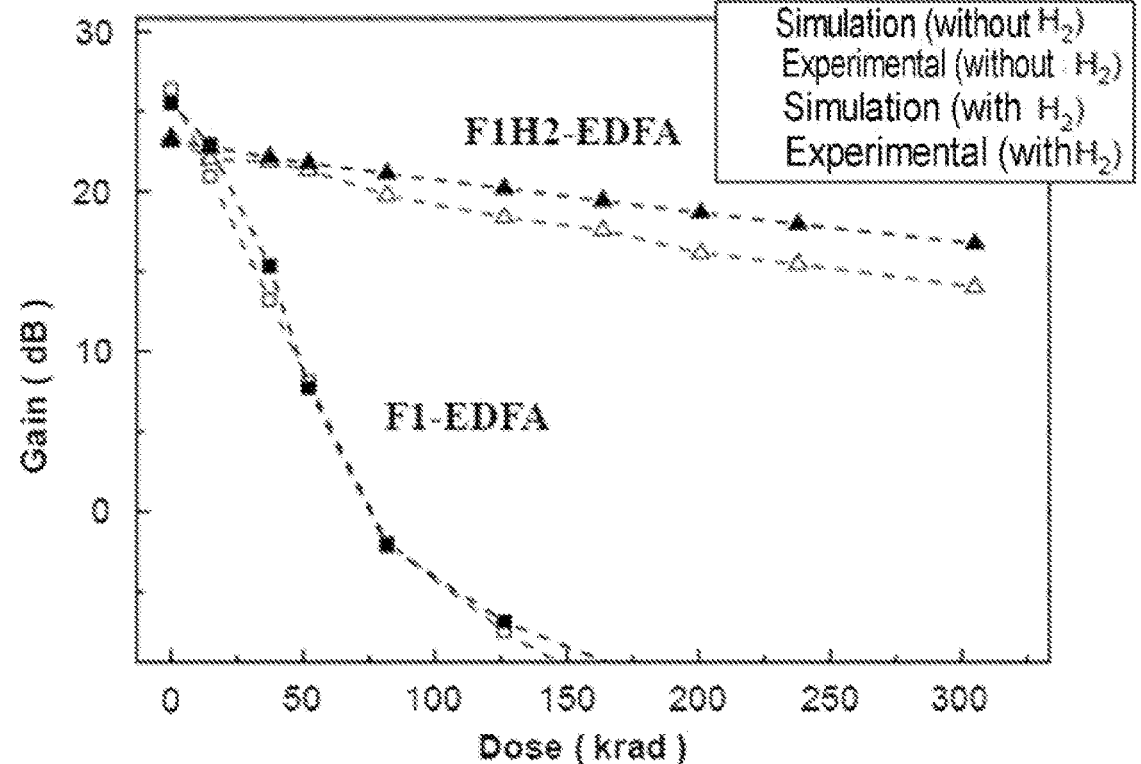
FIG. 2 illustrates the beneficial effects of hydrogen on an erbium-doped optical fiber.
Figure 3A:
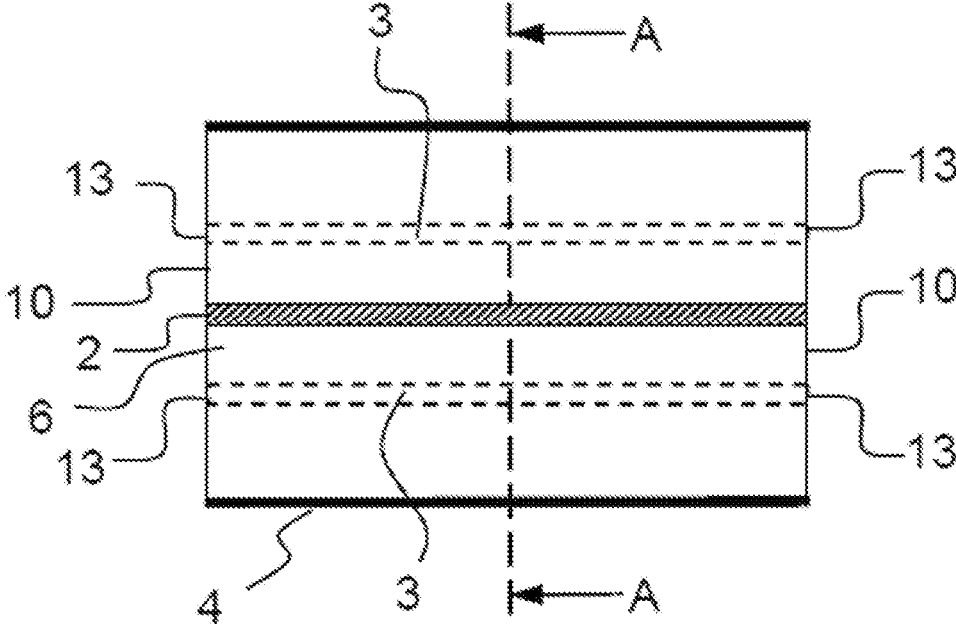
FIG. 3A and FIG. 3B represent silica optical fibers of the state of the art.
Figure 3B:
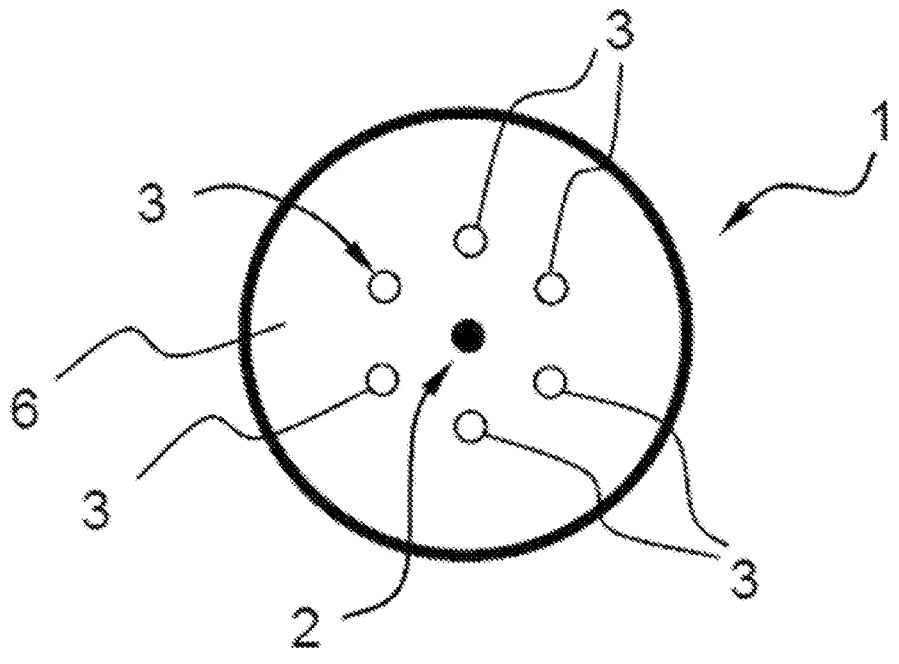
Figure 4A:
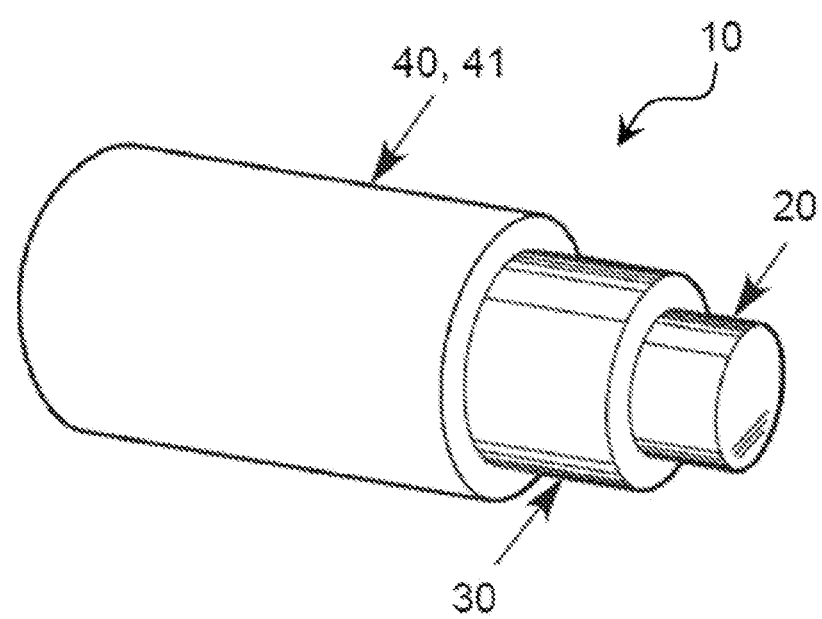
FIG. 4A represents a first variant of a first embodiment of optical fiber according to the invention.
Figure 4B:
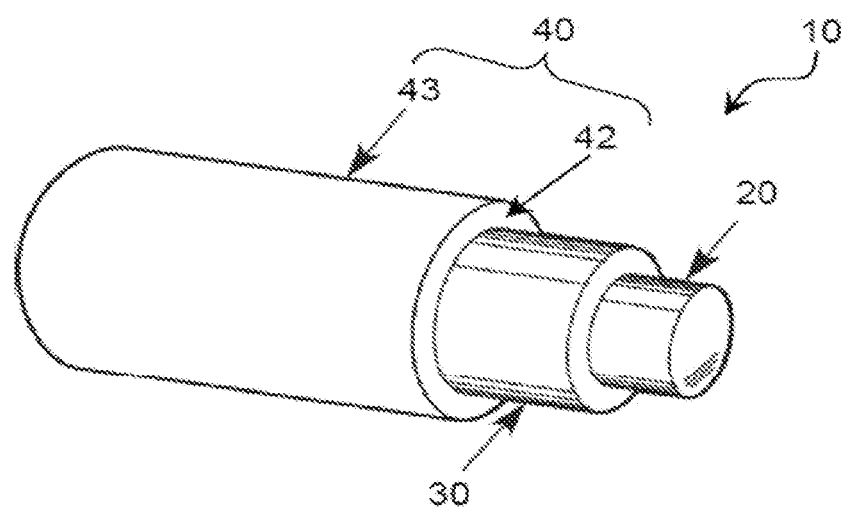
FIG. 4B represents a second variant of a first embodiment of optical fiber according to the invention.

FIGS. 4A and 4B represent a first embodiment of optical fiber. In the two variants represented, a radiation-resistant silica optical fiber 10 comprises a core 20, a sheath 30 surrounding the core and an annular coating 40 of polymer material encasing the sheath, said coating being able to form hydrogen by radiolysis under the effect of the radiations so as to diffuse it into said optical fiber.

The core of the optical fiber can comprise one or more elements from among: silicon, germanium, phosphorus, aluminum, boron, fluorine, nitrogen. It can be non-doped or be doped for example with one or more rare earth dopants from among lanthanum, cerium, erbium, ytterbium, neodymium, thulium and/or holmium.

Similarly, the sheath can comprise one or more elements from among: silicon, germanium, phosphorus, aluminum, boron, fluorine, nitrogen. It can be non-doped or be doped for example with one or more rare earth dopants from among lanthanum, cerium, erbium, ytterbium, neodymium, thulium and/or holmium.

In the first variant of FIG. 4A, the coating 40 is an annular coating surrounding the sheath 30 and consists of a solid layer 41 of a polymer material with high radiolytic rate. The hydrogen formed by the layer of polymer material under the effect of the radiations can thus be diffused into the optical fiber.

In the second variant of FIG. 4B, the coating 40 is also an annular coating surrounding the sheath 30 but it differs from the first variant in that it comprises a layer of gel 42 of a polymer material with high radiolytic rate contained in a jacket 43 preferably of low thickness. The jacket can be made of polymer or of metal. The jacket makes it possible to contain the gel. The hydrogen formed by the gel under the effect of the radiations can thus be diffused into the optical fiber.

The polymer material comprises one or more elements from among: a polyethylene, a polypropylene, a poly-isobutylene, a polyvinyl chloride, polyethylene oxide, a polypropylene oxide, a polyoxymethylene. These materials exhibit a greater radiolytic rate for hydrogen than a coating of acrylate for example which is commonly used as optical fiber coating. The abovementioned materials therefore allow a better hardening of the optical fiber compared to those of the prior art.

Whether it be in solid form or in gel form, the thickness of the coating can vary between a few micrometers and a few millimeters depending on the application and on the radiative environment targeted. It can for example be greater than 50 μm, even greater than 250 μm, or even greater than 400 μm.

Figure 5:
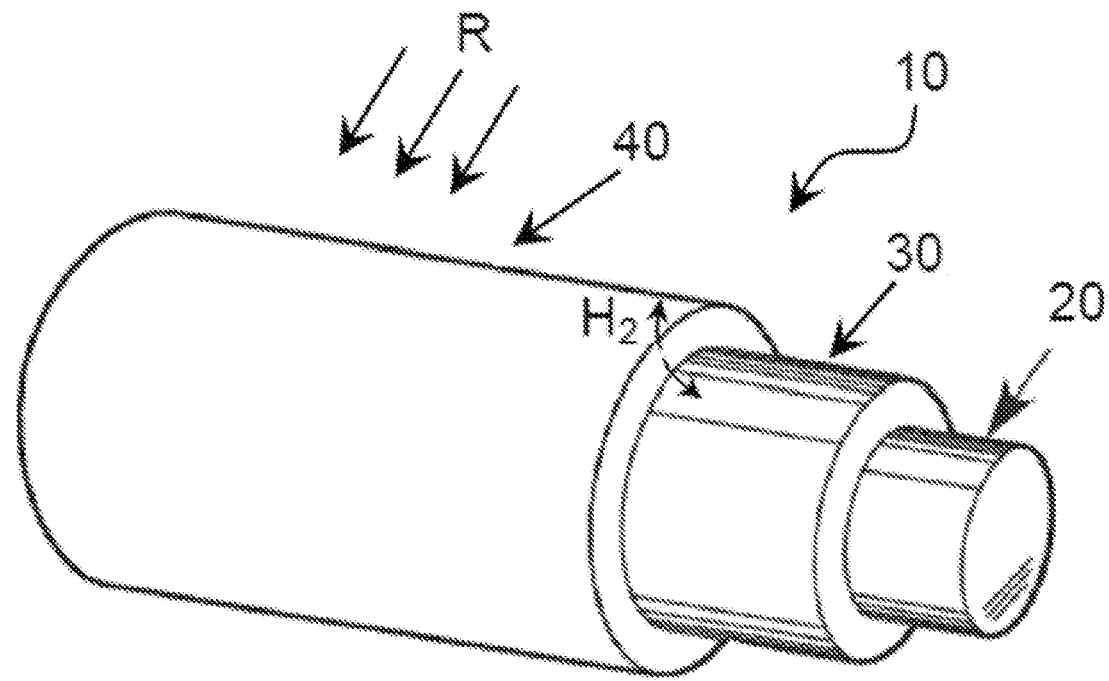
FIG. 5 represents the radiolysis effect of the coating of the optical fiber according to the invention.

FIG. 5 shows the effect of the irradiation R under which the coating 40 undergoes a radiolysis which allows the release of a flow of hydrogen $H_2$ of which a portion diffuses into the sheath 30 and the core 20.

Figure 6A:
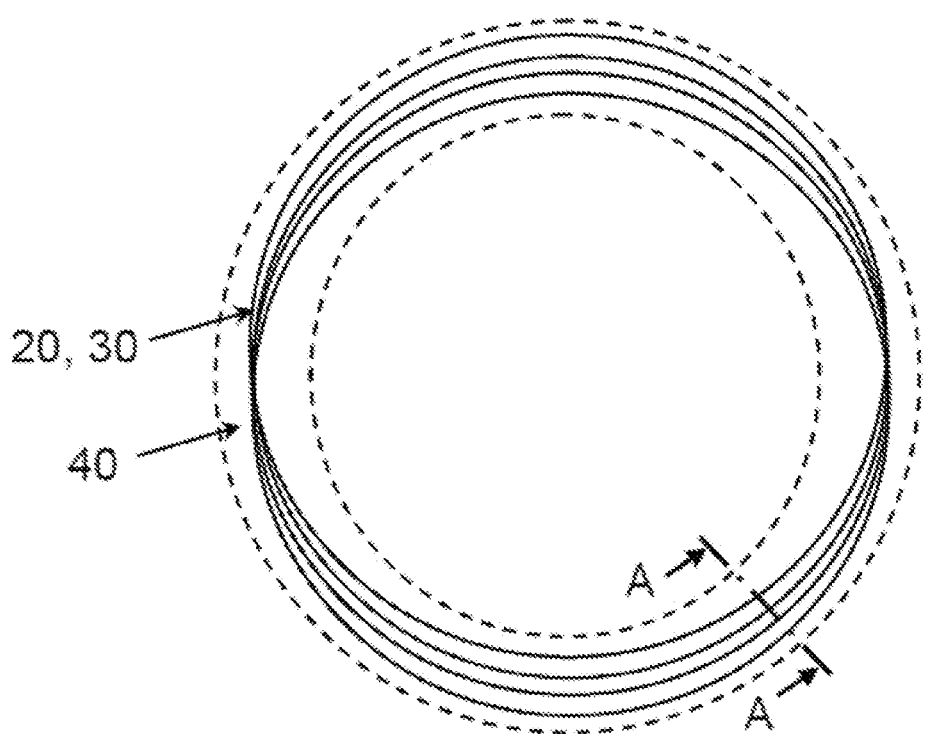
FIG. 6A and FIG. 6B represent a second embodiment of optical fibers according to the invention.
Figure 6B:
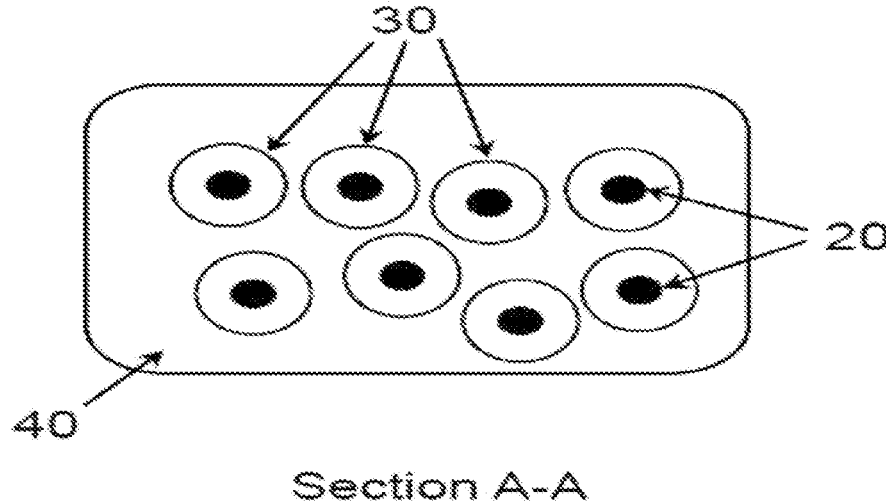

FIGS. 6A and 6B represent a second embodiment in which the optical fiber is formed by embedding a standard optical fiber (core 20 and sheath 30) in a polymer (coating 40). As illustrated, the coils of standard optical fiber are wound and this winding of fibers is embedded in a polymer coating with high radiolytic rate, which is either a solid layer of polymer material (first variant), or a layer of gel of polymer material contained in a jacket (second variant).

This second embodiment is highly advantageous in that it makes it possible to simply produce an optical fiber that is reinforced against radiations.

To demonstrate the effect of the invention, three fibers were produced then tested, one reference fiber and two fibers according to the invention.

A reference optical fiber (fiber of the state of the art) is a single-mode optical fiber in the form of a 50 meter coil, hardened to the radiations by doping, more specifically the core and the sheath of which are made of fluorine-doped silica, the fiber having a diameter of 125 μm.

A first fiber (corresponding to the fiber A of FIG. 7A) is a fiber produced according to a first variant of the second embodiment comprising a coating in the form of a solid layer of low-density polyethylene $(CH_2CH_2)n$ embedding a coil of optical fiber similar to that of the reference optical fiber coil.

A second fiber (corresponding to the fiber B of FIG. 7B) is a fiber produced according to a second variant of the second embodiment comprising a coating in the form of a layer of gel based on a polymer with high radiolytic rate (transmission gel Unigel is intended for ultrasound imaging) contained in a jacket of epoxy resin $(C_{21}H_{25}ClO_5)$, exhibiting a low radiolytic rate to be sure that the hydrogen generated during the test originates from the gel, said coating embedding an optical fiber similar to that of the reference fiber.

To produce the first fiber, approximately 10 g of polyethylene made it possible to encase the coil, which made it possible to form the equivalent of a coating thickness of 420 μm (fiber diameter: 125 μm).

To produce the second fiber, an equivalent quantity (10 g) of gel was poured around the coil in a closed mold, then the epoxy resin jacket was solidified. The total quantity of gel is the same as that necessary to have a thickness of 420 μm over the entire length of the fiber (diameter of fiber alone: 125 μm).

The reference fiber (dotted line curves in FIGS. 7A and 7B) and the two variant fibers according to the invention with a polymer coating with high radiolytic rate (solid line curves in FIGS. 7A and 7B) were tested, and the fibers according to the invention were compared to the reference fiber.

The three fibers were tested under irradiation by gamma radiation with a dose rate of the order of 5.4 kGy/hour for more than 176 hours to achieve a total dose of approximately 0.95 MGy.

Figure 7A:
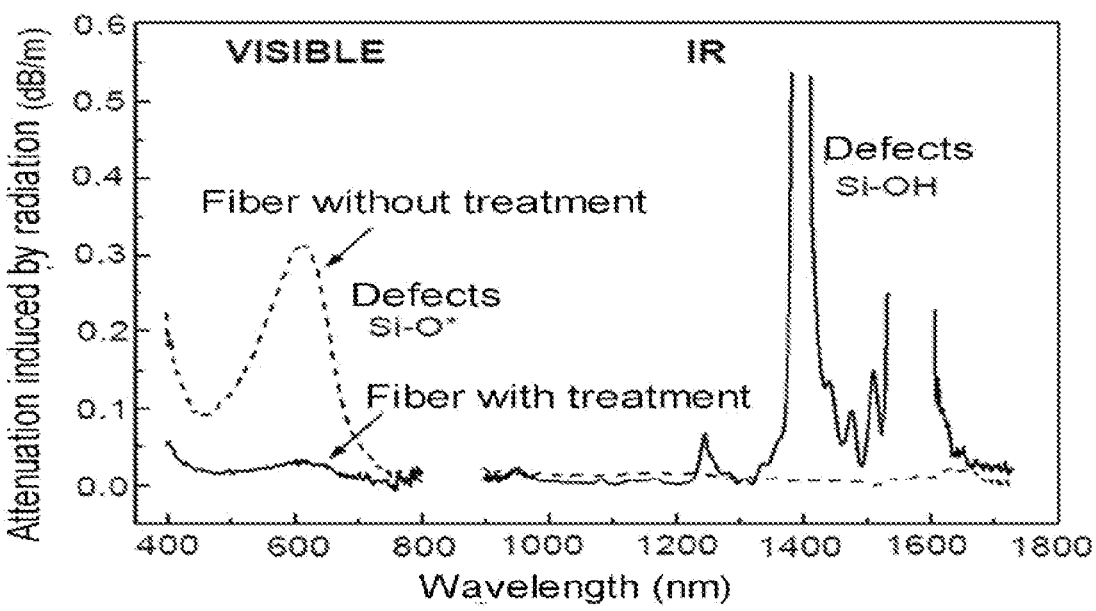
FIG. 7A and FIG. 7B represent the results obtained on optical fibers obtained according to the second embodiment of FIGS. 6A and 6B.
Figure 7B:
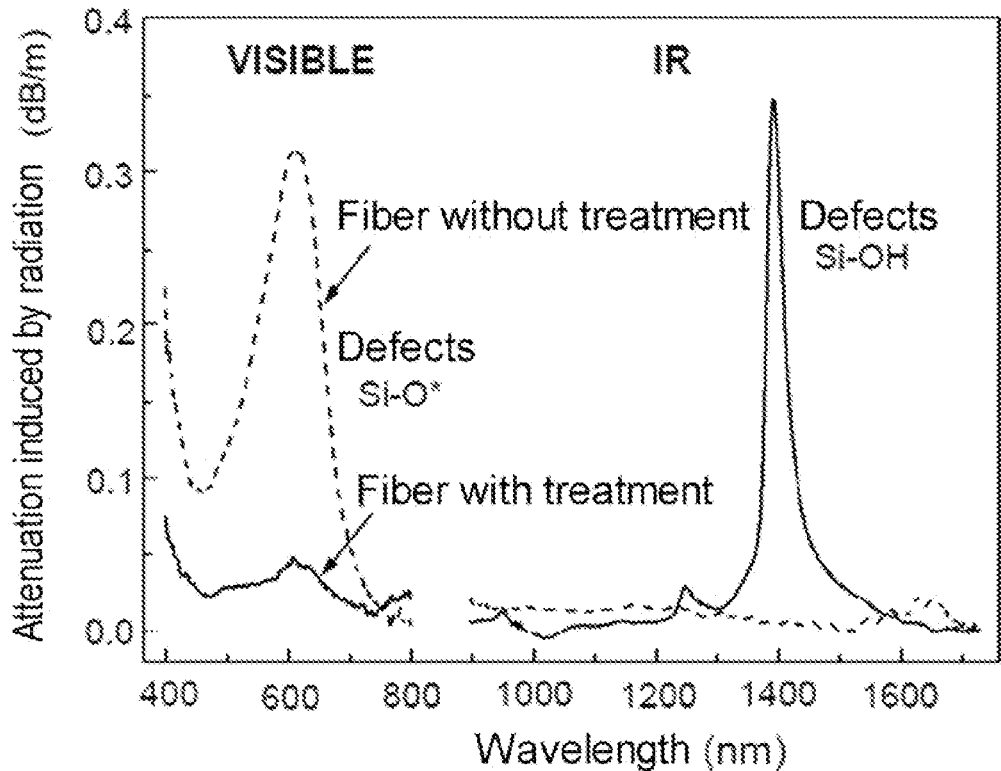

FIGS. 7A and 7B show the results of these tests which reveal the effect of the hydrogen. With the fibers according to the invention, a considerable reduction of the losses in the visible is observed. The hydrogen produced by the irradiation penetrates into the fiber and makes it possible to interact with the Si—O* defects (with an absorption band around 630 nm) by transforming them into defects of Si—OH type (with an absorption band around 1380 nm) according to the following formula:

$$Si-O\bullet+Si\bullet+H_2=SiOH+SiH$$

That forms fibers that are much more transparent in the visible and near UV range.

The effect of the hydrogen can be all the greater if the polymer material, the thickness of the coating, its form or even its physical state (solid, gel contained in a jacket) is suited to the conditions in which the optical fiber is intended to be used.

The present invention is not limited to the embodiments previously described but extends to any embodiment falling within the scope of the claims.

The invention claimed is:

1. A silica optical fiber resistant to radiations (R) comprising:
   a core;
   a sheath surrounding the core;
   a polymer coating encasing the sheath, said coating being able to form hydrogen $(H_2)$ by radiolysis under the effect of the radiations so as to diffuse said hydrogen formed into said optical fiber, the polymer material comprising one or more elements from among: a polyethylene, a polypropylene, a polyisobutylene, a polyvinyl chloride, polyethylene oxide, a polypropylene oxide, a polyoxymethylene.

2. The optical fiber as claimed in claim 1, wherein the coating is a solid layer of polymer material.

3. The optical fiber as claimed in claim 1, wherein the coating comprises a gel layer of polymer material and a jacket capable of containing said gel between the sheath and said jacket.

4. The optical fiber as claimed in claim 3, wherein the jacket is made of polymer or of metal.

5. The optical fiber as claimed in claim 1, wherein the polymer coating forms an annular coating around the sheath.

6. The optical fiber as claimed in claim 1, wherein the core and the sheath, said core and said sheath forming a standard optical fiber, are embedded in the polymer coating.

7. The optical fiber as claimed in claim 6, wherein the standard optical fiber has several windings, said windings being embedded in the polymer coating.

8. The optical fiber as claimed in claim 1, wherein the core of the optical fiber comprises one or more elements from among: silicon, germanium, phosphorus, aluminum, boron, fluorine, even nitrogen.

9. The optical fiber as claimed in claim 1, wherein the core of the optical fiber comprises one or more rare earth dopants from among lanthanum, cerium, erbium, ytterbium, neodymium, thulium and/or holmium.

10. The optical fiber as claimed in claim 1, wherein the sheath comprises one or more elements from among: silicon, germanium, phosphorus, aluminum, boron, fluorine, even nitrogen.

11. An optical fiber device comprising at least one silica optical fiber as claimed in claim 1.

* * * * *